(12) United States Patent
Russell

(10) Patent No.: US 8,965,674 B1
(45) Date of Patent: Feb. 24, 2015

(54) FLUID-BASED ORIENTATION CONTROL SYSTEM

(71) Applicant: The United States of America as represented by the Secretary of the Navy, Washington, DC (US)

(72) Inventor: Stephen D. Russell, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 9 days.

(21) Appl. No.: 14/058,486

(22) Filed: Oct. 21, 2013

(51) Int. Cl.
| | |
|---|---|
| *B64C 17/10* | (2006.01) |
| *B64C 17/00* | (2006.01) |
| *G05D 3/00* | (2006.01) |
| *F02K 7/02* | (2006.01) |
| *B64C 17/08* | (2006.01) |
| *B60P 3/22* | (2006.01) |

(52) U.S. Cl.
CPC *B64C 17/10* (2013.01); *G05D 3/00* (2013.01); *F02K 7/02* (2013.01); *B64C 17/00* (2013.01); *B64C 17/08* (2013.01); *B60P 3/2285* (2013.01)
USPC .................... 701/124; 701/3; 701/13; 701/21

(58) Field of Classification Search
CPC ........ B64C 17/00; B64C 17/08; B64C 17/10; B64C 39/001; B64C 2201/00; B64C 2201/02; B64C 2201/021; B64C 2201/022; B64C 2201/024; B64C 2201/025; B64C 2201/027; B64C 2201/028; B60P 3/224; B60P 3/2225; B60P 3/2285; G05D 3/00; F02K 7/02
USPC ............... 701/3–6, 13, 21, 124; 114/121, 125
See application file for complete search history.

(56) References Cited

U.S. PATENT DOCUMENTS 8,316,970 B1    11/2012   Tran

*Primary Examiner* — Jerrah Edwards
(74) *Attorney, Agent, or Firm* — SPAWAR Systems Center Pacific; Kyle Eppele; Ryan J. Friedl

(57) ABSTRACT

A system includes a fluid reservoir containing a first fluid, a pair of fluidic channels in fluidic connection with the fluid reservoir, a counter-fluid reservoir having a second fluid that is non-miscible with the first fluid, and a pump connected to the fluid reservoir. The pump is configured to pump the first fluid from the fluid reservoir into the pair of fluidic channels. When contained in a vehicle, the system allows for control of the vehicle's orientation. The system may use sensor input to determine when to actuate the pump. Each fluidic channel may have a cross-section that varies along its length. The fluidic channels may be geometrically symmetric about the fluid reservoir. The system may be incorporated into a vehicle to control the vehicle's orientation.

20 Claims, 3 Drawing Sheets

US 8,965,674 B1

FLUID-BASED ORIENTATION CONTROL SYSTEM

FEDERALLY-SPONSORED RESEARCH AND DEVELOPMENT

The Fluid-Based Orientation Control System is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 101696.

BACKGROUND

Typical control systems include actuators, which exert forces in various directions and generate rotational forces or moments about the center of mass of the vehicle, and thus rotate the vehicle in pitch, roll, or yaw. For example, a pitching moment is a vertical force applied at a distance forward or aft from the center of mass of the vehicle, causing the vehicle to pitch up or down. Roll, pitch and yaw refer, in this context, to rotations about the respective axes starting from a defined equilibrium state. The equilibrium roll angle is known as the wing level or zero bank angle for aircraft, equivalent to a level heeling angle on a ship. Yaw is known as "heading". The equilibrium pitch angle in submarine and airship parlance is known as "trim", but in aircraft this usually refers to angle of attack, rather than orientation. However, common usage ignores this distinction between equilibrium and dynamic cases.

A fixed wing aircraft increases or decreases the lift generated by the wings when it pitches nose up or down by increasing or decreasing the angle of attack. The roll angle is also known as bank angle on a fixed wing aircraft, which usually "banks" to change the horizontal direction of flight. An aircraft is usually streamlined from nose to tail to reduce drag, making it typically advantageous to keep the sideslip angle near zero.

The forces acting on a spacecraft are of three types: propulsive force (usually provided by the vehicle's engine thrust); gravitational force exerted by the Earth and other celestial bodies; and aerodynamic lift and drag (when flying in the atmosphere of the Earth or other body). The vehicle's attitude must be taken into account because of its effect on the aerodynamic and propulsive forces. There are other reasons, unrelated to flight dynamics, for controlling the vehicle's attitude in non-powered flight (e.g., thermal control, solar power generation, communications, or astronomical observation). The flight dynamics of spacecraft differ from those of aircraft in that the aerodynamic forces are of very small or vanishingly small effect for most of the vehicle's flight, and cannot be used for attitude control during that time. Also, most of a spacecraft's flight time is usually unpowered, leaving gravity as the dominant force.

Thus, orientation dynamics are critical for the performance of vehicles operating in all domains. With the emergence of unmanned, autonomous, miniature, micro-sized or nano-sized vehicles, conventional control surfaces cannot always be used due to size, weight and power restrictions. Therefore, there is a need for a new low-power, low-profile, compact control system for these types of vehicles.

DETAILED DESCRIPTION OF SOME EMBODIMENTS

The subject matter disclosed herein pertains to the general field of vehicular motion dynamics, specifically the performance, stability, and control of vehicles traversing through the air, undersea or in outer space. The subject matter is concerned with how forces acting on a vehicle influence its speed and attitude with respect to time and the vehicle's orientation and control in three dimensions. The three pertinent vehicular motion dynamics parameters are the angles of rotation in three dimensions about the vehicle's center of mass, known as roll, pitch and yaw, and thus the need to dynamically adjust the vehicle's center of mass. Typical control systems adjust a vehicle's orientation (attitude) about its center of mass. The center of mass of a body is defined as the average location of the mass distribution. In the case of a rigid body, the center of mass is fixed in relation to the body and it may or may not coincide with the geometric center.

Figure 1:
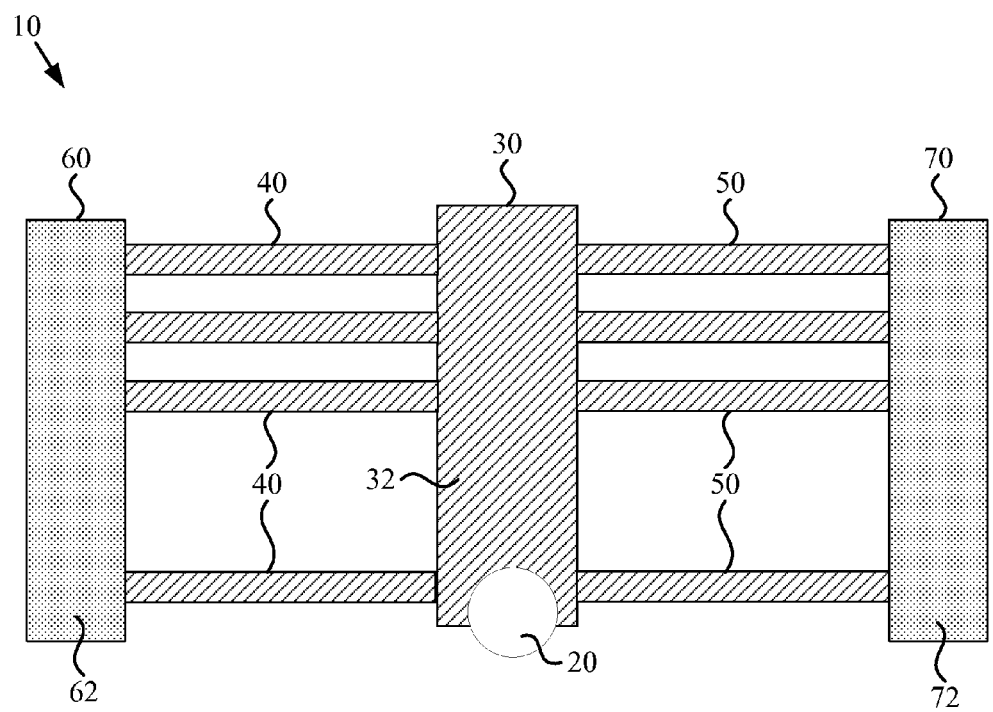
FIG. 1 shows a diagram of an embodiment of a Fluid-Based Orientation Control System.

Disclosed herein is a fluid-based orientation control system that can rapidly reconfigure its mass distribution. FIG. 1 shows an embodiment of a fluid-based orientation control system 10, which includes pump 20, fluid reservoir 30 containing fluid 32, fluidic channels 40 and 50, counter-fluid reservoirs 60 and 70 which contain fluid 62 and 72, respectively. System 10 may be contained within a vehicle, such as a micro-air vehicle, a nano-satellite, and miniature ground, undersea, or surface vehicles. The vehicle's mass distribution will be changed upon a reconfiguration of the mass distribution of system 10.

System 10 contains at least one pair of fluidic channels that are in fluidic connection with fluid reservoir 30. As used herein, the term "in fluidic connection" means that, absent an external force there is no barrier to prevent fluid from flowing between fluid reservoir 30 and fluidic channels 40 and 50. In some embodiments, system 10 contains a plurality of fluidic channel pairs. In some embodiments, a "fluidic channel pair" or a "pair of fluidic channels" may include one fluidic channel 40 and one fluidic channel 50, with the respective channels located directly opposite each other and separated by fluid reservoir 30. In some embodiments, a pair of fluidic channels or fluidic channel pair includes two fluidic channels that are located on the same side of fluid reservoir 30. As shown in FIG. 1, system 10 contains four fluidic channel pairs (or pairs of fluidic channels). In the embodiment shown the fluid channels making up a pair are located opposite fluid reservoir 30, with three pairs being located near one end of fluid reservoir 30 and one pair being located near the other end of fluid reservoir 30.

In some embodiments, the fluidic channel pairs are geometrically symmetric about fluid reservoir 30. In other embodiments, the fluidic channel pairs may be designed asymmetrically about fluid reservoir 30 as required by certain applications. Similarly, while fluidic channels 40 and 50 are typically paired, in some embodiments the number of fluidic channels on either side of fluid reservoir 30 is not identical. For example, there may be eight of fluidic channels 40 and ten of fluidic channels 50. Further, in some embodiments fluidic channels 40 and 50 contain the same shape and dimensions, while in other embodiments fluidic channels 40 and 50 may vary in shape and dimensions. Additionally, the spacing between channels 40 and the spacing between channels 50 need not be the same, nor must each of channels 40 and 50 be evenly distributed lengthwise along fluid reservoir 30, as is shown in FIG. 1.

Figure 2:
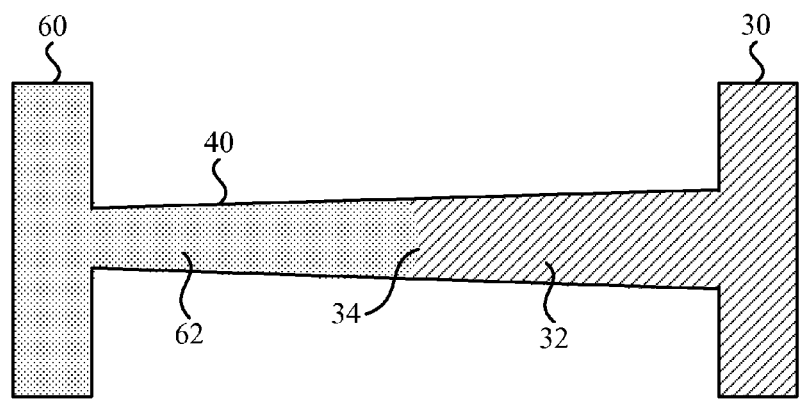
FIG. 2 shows a detailed view of an embodiment of a fluidic channel of the system shown in FIG. 1.

FIG. 2 shows a diagram of an embodiment of a fluidic channel 40. It should be noted that the same configuration may apply to each of fluidic channels 50. As shown, fluidic channel 40 has non-parallel sidewalls and a cross-section that varies along its length, with the cross-section of fluidic channel 40 gradually decreasing as the fluidic channel length increases from fluid reservoir 30 to counter-fluid reservoir 60. In some embodiments, fluidic channels 40 and 50 have parallel sidewalls, such as shown in FIG. 1.

When in fluidic channel 40, fluid 32 has a meniscus 34 corresponding to the physical extent of fluid 32 within fluidic channel 40 with pump 20 off. When pump 20 is actuated to create a back pressure, fluid 32 is extended from fluid reservoir 30 into fluidic channel 40 towards counter-fluid reservoir 60. Fluidic channel 40 acts as a micro-capillary against fluid 62 from counter-fluid reservoir 60.

Fluid 32 may comprise any fluid (gas or liquid). Fluid 62 may comprise any fluid (gas or liquid) that is non-miscible with fluid 32. As an example, fluid 32 may be a liquid, such as water, aqueous solutions, electrolytic solutions, buffered solutions, alcohols, glycols and the like, while fluid 62 may be a gas, such as air, nitrogen, argon and halocarbons. The choice of fluids 32 and 62 provides an ability for system 10 to operate in a wide temperature range and in a variety of environments, and may also include at least a partial vacuum formed in fluid channel 40 if the capillary-like fluid channels are appropriately designed. The type and amount of fluids 32 and 62 may be chosen such that fluid 32 from fluid reservoir 30 does not enter into counter-fluid reservoirs 60 and 70 while pump 20 is off and/or when pump 20 is in operation.

In some embodiments, fluidic channels 40 and 50 may be configured to have substantially parallel sidewalls when viewed in cross-section (i.e. cylindrically shaped in three dimensions) along their entire length, as is shown in FIG. 1. In this case, capillary action may be used to extract fluid 32 from fluid reservoir 30 to partially fill fluidic channel 40 so that pump 20 need only be used to make minute changes to the center of mass. This is accomplished using surface adhesion which pulls the liquid column up until there is a sufficient mass of liquid for gravitational forces to overcome the intermolecular forces.

The contact length (around the edge) between the top of the fluid column and the top of fluidic channel 40 is proportional to the diameter of fluidic channel 40, while the weight of the liquid column is proportional to the square of the fluidic channel's diameter. Thus, a narrow fluidic channel 40 will draw a fluid column higher than a wide fluidic channel 40. The height h of a fluid column is given by:

$$h = \frac{2\gamma \cos\theta}{\rho g r}, \quad (\text{Eq. 1})$$

where γ is the fluid-air surface tension (force/unit length), θ is the contact angle, ρ is the density of the fluid (mass/volume), g is local gravitational field strength (force/unit mass), and r is radius of fluidic channel 40 (length). However, in some applications it is advantageous to have non-parallel sidewalls, such as shown in FIG. 2, to provide an ever increasing or decreasing cross-section along the length of fluidic channels 40 to modify the back-pressure so that the dynamic response of system 10 can be more effectively controlled by pump 20.

Figure 3:
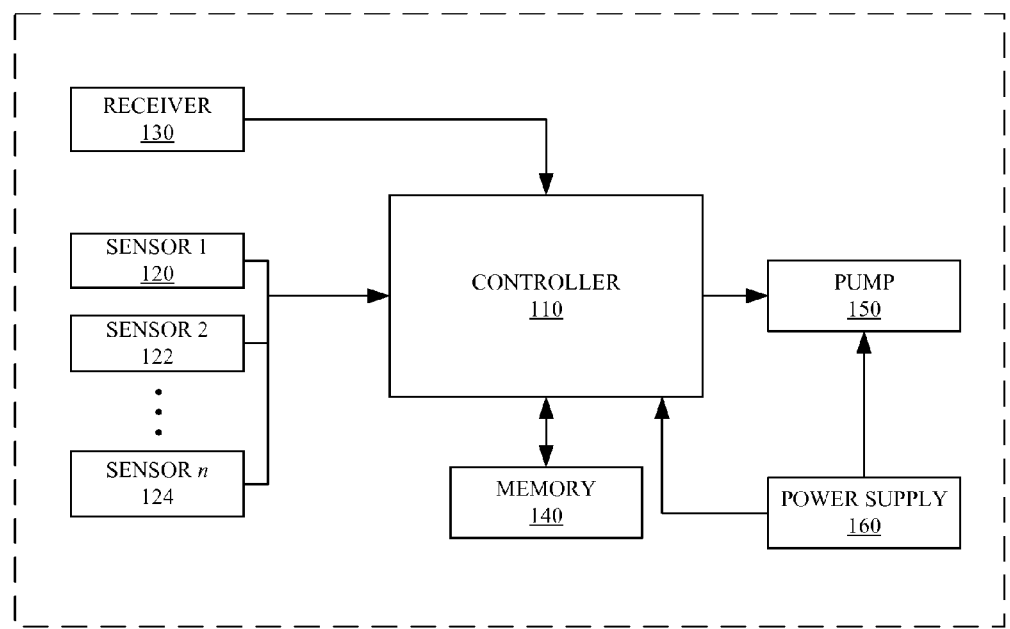
FIG. 3 shows a block diagram of the operational components for an embodiment of a Fluid-Based Orientation Control System.

FIG. 3 shows a block diagram of the operational components for an embodiment of a fluid-based orientation control system contained within a vehicle 100. As an example, vehicle 100 may be a micro-air vehicle, a nano-satellite, or a miniature ground, undersea, or surface vehicle. The components shown in vehicle 100 may be used in conjunction with and may form a part of system 10 shown in FIG. 1. It should be noted that other components necessary for the operation of vehicle 100, such as the motor and the transmission, are not shown.

Vehicle 100 includes a controller 110 connected to sensors 120, 122, and 124, receiver 130, memory 140, pump 150, and power supply 160. Sensors 120, 122, and 124 are configured to detect a vehicle's orientation dynamics parameters such as roll, pitch, and yaw. Examples of sensors 120, 122, and 124 include a gyroscope, accelerometer, a camera, and a magnetometer. The output of sensors 120, 122, and 124 is provided as an input to controller 110.

Upon receiving input from sensors 120, 122, and 124, controller 110 is configured to send a signal to pump 150 to activate pump 150 for a time T. Controller 110 is also configured, via software that is stored therein or accessed from memory 140, to then measure the difference between the vehicle's actual and desired values of orientation dynamics parameters. In some embodiments, the actual values of orientation dynamics parameters are stored internally within controller 110, while in other embodiments the actual values are accessed by controller 110 from memory 140. The vehicle's desired values of orientation dynamics parameters may be received by controller 110 from a receiver 130, which may receive them, for example, wirelessly from a system user.

When time T has elapsed, controller 110 is further configured to re-measure the difference between the actual and desired values of orientation dynamics parameters for vehicle 100 and compare the difference to a variance threshold that may be predetermined. Controller 110 may then be configured to determine if the variance threshold is exceeded, and if not, meaning that the variance is acceptably small, to send a signal to pump 150 to deactivate pump 150. If the threshold is exceeded, controller 120 is configured to re-measure the difference between actual and desired values of the vehicle's orientation dynamics parameters and actuate pump 150 for an additional time period.

In some embodiments, power supply 160 is configured to provide power to controller 110 and pump 150. In some embodiments, power supply 160 may provide power to any other components shown in FIG. 3. Components within vehicle 100 that are not powered by power supply 160 may be self-powered by various means as would be recognized by one having ordinary skill in the art. As an example, power supply 160 may comprise a general purpose, commercially available power supply, the characteristics of which will vary depending upon the specific design requirements and/or operational requirements of vehicle 100.

In some embodiments, vehicle 100 may include additional sensors (not shown), contained within each fluidic channel and connected to the controller, for determining how much fluid is in a particular fluidic channel, the pressure within the fluidic channel, or the rate of flow within the channel. Additionally, vehicle 100 may include valves associated with each of the fluidic channels, to provide for opening or closing the fluid pathway for particular fluid channels to achieve a particular orientation for vehicle 100. In such embodiments, the valves may be controlled by a signal from controller 110.

Figure 4:
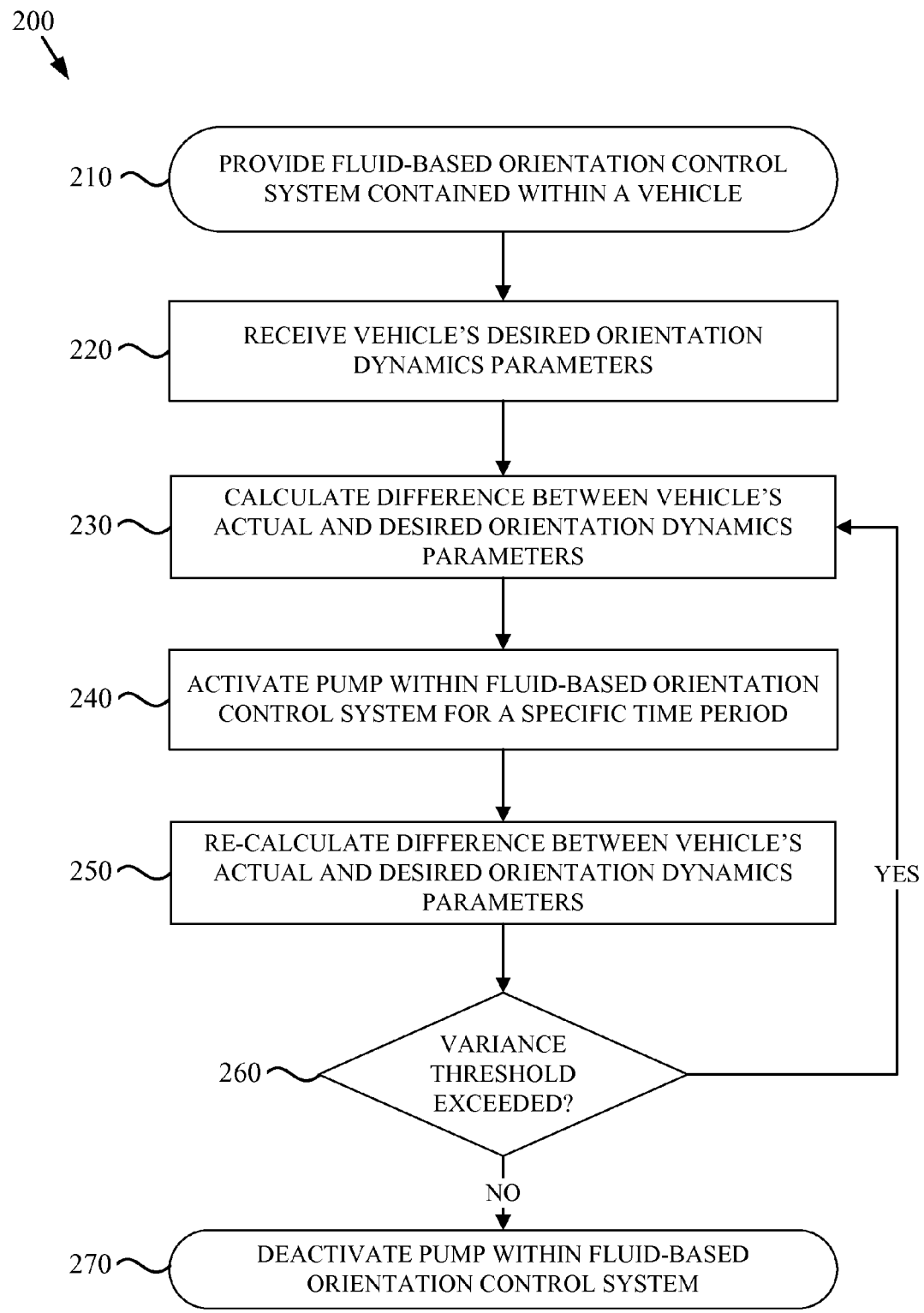
FIG. 4 shows a flowchart of a method for operating the Fluid-Based Orientation Control System.

FIG. 4 shows a flowchart of an embodiment of a method 200 for operating a fluid-based orientation control system, such as system 10. By way of example, method 200 will be discussed with reference to FIGS. 1-3. Method 200 may begin with step 210, which involves providing a fluid-based orientation control system, such as system 10, contained within a vehicle, such as a miniature vehicle. The vehicle may traverse through the air, undersea, on the surface, or in outer space.

Step 220 involves receiving, such as from receiver 130, the vehicle's desired orientation dynamics parameters. As an example, the orientation dynamics parameters may include roll, pitch, and yaw. Depending on the regime of operation, other vehicle dynamics parameters may include center of mass, moment of inertia, directional stability, drift, vibration and the like for both the present state and future state parameter estimation. Then, step 230 involves measuring the difference, such as by using controller 110, between the desired values of the vehicle's orientation dynamics parameters from the actual values of the vehicle's orientation dynamics parameters. The actual values of the vehicle's orientation dynamics parameters may be stored within memory 140, having been stored there by a signal sent from controller 110 based upon input from sensors 120, 122, and 124.

Step 240 involves actuating pump 20 for a time T to redistribute fluid 32 from fluid reservoir 30 to fluidic channels 40 and 50 to modify the vehicle's center of mass. The actuation of pump 20 may be performed by a signal from controller 110. Step 250 then involves re-measuring the difference, such as by using controller 110, between the desired values of the vehicle's orientation dynamics parameters from the actual values of the vehicle's orientation dynamics parameters and comparing the difference to an allowed variance threshold. In some embodiments, the variance threshold is pre-determined and is stored within memory 140 accessed by controller 110.

Step 260 then involves a determination, such as by using controller 110, whether or not the variance threshold has been exceeded. In some embodiments, step 260 determines whether or not the variance threshold has been exceeded for any one of the vehicle's orientation dynamics parameters. In other embodiments, step 260 involves a determination whether the variance threshold has been exceeded for any all of the vehicle's orientation dynamics parameters. If the variance threshold has not been exceeded, step 270 involves deactivating pump 20, such as via a signal from controller 110. If the variance threshold has been exceeded, method 200 proceeds back to step 230. In some embodiments, the determination of step 260 may be repeated for each of three dimensions needed for control of the vehicle's orientation dynamics.

It should be noted that a plurality of systems 10 can be combined to control multiple degrees of freedom, by assembly in orthogonal directions or in other configurations that are compatible to the vehicle's structure. Further, the embodiments of the invention may be used on micro-vehicles and nano-vehicles to adjust in-real time the vehicle's center of mass to accommodate changes in payload due to fuel consumption or, for example, changes in sensor or communication payloads.

System 10 may, for example, be fabricated in a substantially planar structure or in materials that can be conformed to a curved surface. As an example, fabrication techniques for a curved surface are described in U.S. Pat. No. 7,274,413 entitled "Flexible Video Display Apparatus and Method" by Sullivan et al.

Many modifications and variations of the Fluid-Based Orientation Control System are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A system comprising:
a fluid reservoir containing a first fluid;
a pair of fluidic channels in fluidic connection with the fluid reservoir, wherein each fluidic channel of the pair of fluidic channels has a cross-section that varies along its length;
at least one counter-fluid reservoir, in fluidic connection with the pair of fluidic channels, containing a second fluid that is non-miscible with the first fluid; and
a pump, connected to the fluid reservoir, configured to pump the first fluid from the fluid reservoir at least partially through the pair of fluidic channels.

2. The system of claim 1, wherein a first fluidic channel of the pair of fluidic channels is located opposite the fluid reservoir of a second fluidic channel of the pair of fluidic channels.

3. The system of claim 2, wherein the at least one counter-fluid reservoir is two counter-fluid reservoirs, wherein the first fluidic channel is in fluidic connection with one of the counter-fluid reservoirs and the second fluidic channel is in fluidic connection with the other of the counter-fluid reservoirs.

4. The system of claim 1, wherein the cross-section of each fluidic channel of the pair of fluidic channels gradually decreases as the fluidic channel length increases from the fluid reservoir to the counter-fluid reservoir.

5. The system of claim 1, wherein the first fluid is a liquid.

6. The system of claim 1, wherein the second fluid is a gas.

7. The system of claim 1, wherein the fluidic channels are geometrically symmetric about the fluid reservoir.

8. The system of claim 1, wherein the fluid reservoir, the pair of fluidic channels, the counter-fluid reservoir, and the pump are all contained within a vehicle, the system further comprising:
a controller connected to the pump; and
one or more sensors, connected to the controller, configured to detect the vehicle's actual orientation dynamics parameters, wherein the controller is configured to receive sensor input from the sensors and control the pump using the sensor input.

9. The system of claim 8, wherein the sensor is a gyroscope.

10. A system comprising:
a fluid reservoir containing a first fluid;
a pair of fluidic channels in fluidic connection with the fluid reservoir, wherein each fluidic channel of the pair of fluidic channels has a cross-section that varies along its length;
at least one counter-fluid reservoir, in fluidic connection with the pair of fluidic channels, containing a second fluid that is non-miscible with the first fluid;
a pump connected to the fluid reservoir;
a controller connected to the pump; and
one or more sensors connected to the controller, wherein the controller is configured to receive sensor input from the sensors and, based upon the sensor input, actuate the pump to cause the pump to pump the first fluid from the fluid reservoir at least partially through the pair of fluidic channels.

11. The system of claim 10, wherein a first fluidic channel of the pair of fluidic channels is located opposite the fluid reservoir of a second fluidic channel of the pair of fluidic channels.

12. The system of claim 10, wherein the at least one counter-fluid reservoir is two counter-fluid reservoirs, wherein the first fluidic channel is in fluidic connection with one of the counter-fluid reservoirs and the second fluidic channel is in fluidic connection with the other of the counter-fluid reservoirs.

13. The system of claim 10, wherein the cross-section of each fluidic channel of the pair of fluidic channels gradually decreases as the fluidic channel length increases from the fluid reservoir to the counter-fluid reservoir.

14. The system of claim 10, wherein the fluidic channels are geometrically symmetric about the fluid reservoir.

15. The system of claim 10, wherein the fluid reservoir, the pair of fluidic channels, the counter-fluid reservoir, the pump, the controller, and the sensors are all contained within a vehicle, the system further comprising a memory module connected to the controller, the memory module having the vehicle's desired values of orientation dynamics parameters stored therein, wherein the sensor input comprises the vehicle's actual values of orientation dynamics parameters, wherein the controller is configured to actuate the pump based upon the difference between the vehicle's desired values of orientation dynamics parameters and the vehicle's actual values of orientation dynamics parameters.

16. A method comprising the steps of:
   providing a vehicle containing
      a fluid reservoir containing a first fluid,
      a pair of fluidic channels in fluidic connection with the fluid reservoir, wherein each fluidic channel of the pair of fluidic channels has a cross-section that varies along its length,
      at least one counter-fluid reservoir, in fluid connection with the pair of fluidic channels, containing a second fluid,
      a pump, connected to the fluid reservoir, configured to pump the first fluid from the fluid reservoir at least partially through the pair of fluidic channels,
      a controller connected to the pump,
      a memory module connected to the controller, the memory module having the vehicle's desired values of orientation dynamics parameters stored therein, and
      at least one sensor configured to detect values of the vehicle's actual orientation dynamics parameters;
   determining the difference between the values of the vehicle's actual orientation dynamics parameters from the vehicle's desired values of orientation dynamics parameters; and
   actuating the pump for a time T based on the determined difference.

17. The method of claim 16 further comprising the steps of:
   performing an additional determination of the difference between the values of the vehicle's actual orientation dynamics parameters from the vehicle's desired values of orientation dynamics parameters; and
   determining if the additional determined difference exceeds a pre-determined threshold.

18. The method of claim 17 further comprising the step of deactivating the pump if the additional determined difference does not exceed the pre-determined threshold.

19. The method of claim 17 further comprising the step of actuating the pump for an additional time T if the additional determined difference exceeds the pre-determined threshold.

20. The method of claim 16, wherein the cross-section of each fluidic channel of the pair of fluidic channels gradually decreases as the fluidic channel length increases from the fluid reservoir to the counter-fluid reservoir.

* * * * *